United States Patent [19]

Block

[11] 4,240,915
[45] Dec. 23, 1980

[54] DRILLING MUD VISCOSIFIER

[75] Inventor: Jacob Block, Rockville, Md.

[73] Assignee: W. R. Grace & Co., New York, N.Y.

[21] Appl. No.: 924,171

[22] Filed: Jul. 13, 1978

[51] Int. Cl.³ .................................................. C09K 7/04
[52] U.S. Cl. .............................. 252/8.5 B; 252/8.5 A
[58] Field of Search .............. 252/8.5 A, 8.5 B, 8.5 R, 252/317

[56] References Cited

U.S. PATENT DOCUMENTS

| | | | |
|---|---|---|---|
| 1,871,781 | 8/1932 | Crow et al. | 252/317 X |
| 1,935,178 | 11/1933 | Connolly | 252/317 X |
| 2,085,129 | 6/1937 | Stoewener | 252/317 |
| 3,105,053 | 9/1963 | Cramer et al. | 252/317 X |
| 3,815,681 | 6/1974 | Richardson | 166/281 |
| 3,852,201 | 12/1974 | Jackson | 252/8.5 |
| 3,860,070 | 1/1975 | Herce et al. | 166/283 X |
| 3,878,110 | 4/1975 | Miller et al. | 252/8.5 |
| 3,988,246 | 10/1976 | Hartfiel | 252/8.5 |
| 4,045,357 | 8/1977 | Reed | 252/8.5 |

*Primary Examiner*—Herbert B. Guynn
*Attorney, Agent, or Firm*—Howard J. Troffkin; William W. McDowell, Jr.

[57] ABSTRACT

Water-based, clay-free drilling fluids for use in drilling bore holes into subterranean formations having an aqueous mixture therein comprising water and an aluminum hydroxide agent. The aqueous phase of the drilling fluids has the aluminum hydroxide agent therein in an amount sufficient to impart non-Newtonian, pseudoplastic properties to the fluids when the fluids have a pH of at least about 8. The present invention further relates to an improved process of drilling bore holes into subterranean formations using the subject drilling fluids.

11 Claims, 1 Drawing Figure

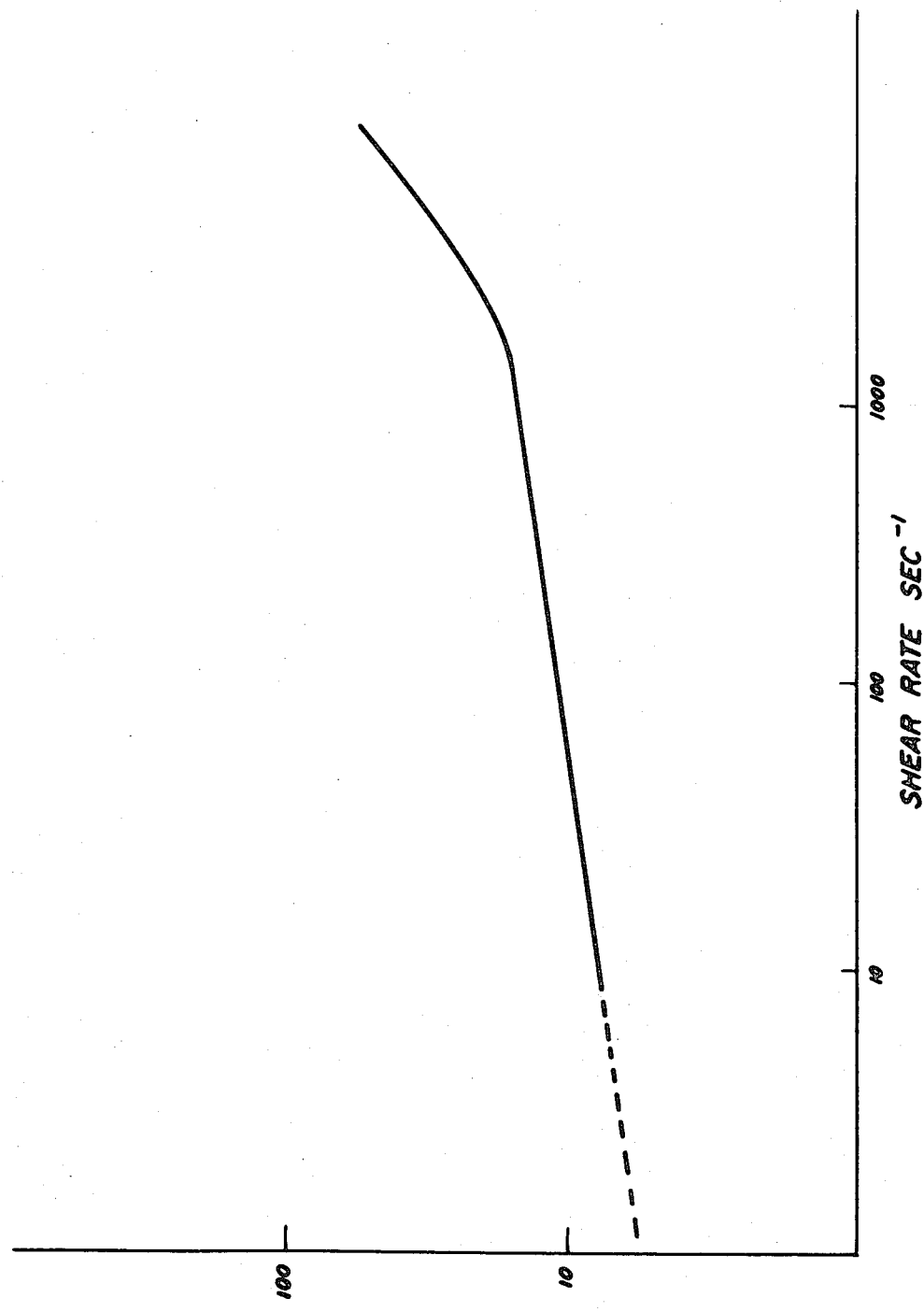

DRILLING MUD VISCOSIFIER

BACKGROUND OF THE INVENTION

The present invention relates to the formation of water-based, clay-free drilling fluids containing an effective amount of an aluminum hydroxide agent as the agent to impart viscosity and pseudoplastic properties to the fluid and to methods of using such fluids in the drilling of subterranean soil.

In normal well drilling operations in which a bore hole is drilled by a rotary method, the bore hole is generally filled with a drilling fluid or mud which is circulated therein. Drilling fluids are usually pumped down through the drill stem of the rotary rig, circulated around the drill bit and returned to the surface through the annular passage between the drill stem and well casing. These drilling fluids perform a number of functions including lubricating the drill stem and bit, cooling the bit, carrying the cuttings from the bit up the bore hole to the surface where the cuttings may be separated and disposed of, and providing a hydrostatic head against the walls of the well to contain downhole geopressure.

A primary requisite of a satisfactory drilling fluid is its ability to readily circulate and flow, that is, to have low viscosity, under the high shear conditions which are present in the environs of the drill bit while, at the same time, also being capable of exhibiting comparatively high viscosities and carrying power under varying low shear conditions which are exerted in the annular passage between the drill stem and the well casing during the fluid's upward flow movement. In generic terms, the drilling fluid must exhibit non-Newtonian properties as a pseudoplastic fluid, especially under varying low shear rates such as are encountered in the annular passage.

The drilling fluid should also be capable of exhibiting the above described pseudoplastic properties under changing conditions encountered during the drilling operation due to the fact that the bore hole traverses various strata such as shales, clay, etc., and the cuttings of these materials become dispersed in the fluid media. The drilling fluid components should, therefore, be substantially stable to the presence of various calcium compounds and to sodium chloride which may be present in the fluid from the soil strata with which it is in contact and/or due to the use of salt water used to form the drilling fluid.

It is also well known that as the bore hole increases in depth the temperatures encountered substantially increase above that found at the earth's surface. This is especially a problem found in drilling of depths greater than about 9,000 feet as is presently becoming a more common practice. In addition, heat is generated by frictional forces on the drill bit. It is, therefore, not uncommon for the drilling fluids to encounter temperatures of 200° F. or greater. Components used in forming drilling fluids should be stable with respect to elevated temperature conditions.

A wide variety of drilling fluids have been used, including aqueous based liquids, hydrocarbon based liquids, air and other gases, mist, foams and the like. Since great volumes of drilling fluids are required for the purposes of providing a cooling medium for the rotary bits and a means of carrying off the drilled particles, most of the conventional fluids used have been based on water. Water, being a Newtonian fluid, does not have the needed capability to efficiently carry the drilled particles from the bore hole to the surface. This becomes increasingly apparent as the bore hole increases in depth.

It is a widely held and accepted theory that the viscosities suitable for creating a particle carrying capacity in the fluid can be achieved with the drilling fluid having pseudoplastic properties, that is, that the viscosity must be sufficient to prevent the drilled particles from separating from the drilling fluid when the fluid is under the influence of low shear forces of about 10 to about 400 to 800 $sec^{-1}$ such as encountered in the annular passage. In order to obtain the requisite pseudoplastic properties, it has been thought desirable to use certain clay or colloidal clay bodies such as bentonite or attapulgite clays. As a result, the drilling fluids have been usually referred to as "muds." The use of clay-based drilling fluids has provided the means of initially meeting the two basic requirements of drilling fluids, i.e., cooling and particle removal. However, these clay-based drilling fluids are highly unstable when they come in contact with various salts commonly found in drilled earth formations.

Materials which have come into expanding use as the viscosifying agents of drilling compositions are Xanthan gums such as are described in U.S. Pat. Nos. 3,198,268; 3,208,526; 3,251,147; 3,243,000; 3,307,016 and 3,319,715. These materials have been found to cause aqueous drilling fluids to exhibit pseudoplastic properties under varying low shear forces. These materials, however, whether used alone or in combination with other additives, are irreversibly degraded by the elevated temperatures often encountered during conventional drilling operations. The high cost of the Xanthan gums and the high rate of degradation limit their usefulness to specialized operations.

Aluminum compounds have been used as a component of various aqueous compositions. U.S. Pat. No. 3,509,066 to Jacob is directed to an improved method of processing and purifying attapulgite clay. Jacob discloses that the addition of certain inorganic compounds, such as aluminum hydroxide, to aqueous dispersions of colloidal attapulgite clay reduces the viscosity of the dispersion, and, therfore, permits the purification processing of the clay at higher concentrations than normally believed feasible. U.S. Pat. No. 4,058,420 to Barnhard et al discloses the use of hydrous metal oxide, such as aluminum oxide monohydrate, as a useful thickening agent for explosive compositions.

U.S. Pat. No. 4,045,357 to Reed discloses an aqueous drilling fluid suitable for drilling through shale deposits. The fluid has a synthetic organic polymer as its viscosifying agent, a water-soluble aluminum compound to stabilize the shale clay deposit through which the bore hole passes and a corrosion inhibiting agent due to the acidic nature of the formed fluid. It is well known (see W. Blum, J.A.C.S., Vol. 35, pg. 1500 (1913) and J. H. Hildebrand, J.A.C.S., Vol. 35, pg. 863 (1913), that aqueous solutions of hydroxy aluminum compounds as described by Reed are strongly acidic having a pH of from about 2 to 4.5. Acidic solutions, such as disclosed by Reed, are not deemed useful as a drilling fluid due to their corrosive and destructive effect on the various metallic elements of drilling equipment.

There is a general need for a drilling fluid viscosifier which is capable of being produced at low cost, which renders an aqueous drilling fluid pseudoplastic so as to exhibit ease of fluidity under high shear conditions such as found at the drill bit site, while exhibiting an increased, substantially stable viscosity under low shear conditions and which is substantially stable under conditions normally encountered in drilling a bore hole.

SUMMARY OF THE INVENTION

It is an object of the present invention to form water-based, clay-free fluids which exhibit non-Newtonian, pseudoplastic properties so as to be capable of drilling bore holes and the like in an efficient manner. Further, it is the object of the present invention to form a drilling fluid which is substantially stable to varying environmental conditions of temperature and salt content normally encountered in bore hole drilling.

The present invention is directed to clay-free drilling fluids useful in effectively aiding the drilling of bore holes and the like into subterranean strata wherein the fluid is a water-based fluid having an effective amount of an aluminum hydroxide agent therein to impart viscosity and pseudoplasticity to the fluid and wherein the aqueous fluid has a pH of at least about 8. It has been unexpectedly found that drilling fluids described herein exhibit non-Newtonian, pseudoplastic properties under varying low shear forces and are substantially stable under varying temperature and salt conditions as are commonly encountered in the drilling of bore holes and the like.

BRIEF DESCRIPTION OF DRAWING

FIG. 1 represents a typical curve of shear stress vs. shear rate for fluids formed in accordance with the present invention.

DETAILED DESCRIPTION OF THE INVENTION

The present invention is directed to a viscosifier for water-based, clay-free drilling fluid compositions to cause the composition to exhibit pseudoplastic properties, and to methods of drilling bore holes into the earth by utilizing the subject drilling fluid composition. Specifically, the subject invention is directed to drilling fluid compositions comprising water and an aluminum hydroxide agent as the viscosifying and pseudoplasticizing agent.

The aluminum hydroxide agents found useful according to the present invention are agents which are substantially water-insoluble, that is, agents which are in suspension or dispersion in aqueous systems which have a pH of at least about 8. Further, the subject aluminum hydroxide agents presently possess a definite characterizing x-ray diffraction spectra having a major characterizing diffraction peak at 6.3±0.2 angstroms or characterized by x-ray diffraction spectra as being amorphous, that is, having substantially no x-ray diffraction pattern within the range of from 1.5 to 17 angstroms. The spectra is determined by standard techniques using the K-α doublet of copper as the radiation source.

It has been unexpectedly found that aqueous suspensions or dispersions of aluminum hydroxide agents having the above-described x-ray characterization are capable of imparting non-Newtonian, pseudoplastic properties to the aqueous system. The aluminum hydroxide agent of the present invention can be formed in known manners under substantially basic conditions. The agent has hydroxyl groups as an integral part of the agent's composition including bound water of hydration.

Various methods are well known to form the desired agents found useful in the subject invention. It has been found that due to the amphoteric nature of aluminum, the aluminum hydroxide agent of the present invention can be formed by contacting an aqueous solution or suspension of an acidic or basic precursor material with a neutralizing agent. The basic precursor material can be an alkali metal aluminate which is contacted with a sufficient amount of an acidic agent such as inorganic mineral acid, as for example sulfuric, hydrochloric, nitric and the like, and preferably hydrochloric, or a salt of a strong acid and a weak base to cause the pH of the solution to be reduced to within the ranges described hereinbelow and to thereby convert the aluminate to the aluminum hydroxide agent of the present invention. The acid can be used in slight excess and then back titrated with a base to the desired pH to assure conversion of the precursor to the hydroxide. The aluminate precursor can be any commercially available alkali metal aluminate or the aluminate can be obtained by conventional techniques such as by the action of a base on aluminum or aluminum oxide. The aluminate normally will have an alkali metal oxide to aluminum oxide mole ratio of from about 1:1 to 4:1.

Suitable acidic precursor materials for forming the aluminum hydroxide agent of the present invention are water-soluble, acidic aluminum salts such as aluminum halides, preferably aluminum chloride, as well as aluminum sulfate, aluminum nitrate and the like. Aqueous solutions of these precursor materials can be contacted with a sufficient amount of a water-soluble base, such as an alkali metal hydroxide as, for example, sodium hydroxide, potassium hydroxide and the like or ammonium hydroxide to cause the resultant aqueous system to have a pH within the range described hereinbelow and to thereby form the desired aluminum hydroxide agent. The base should be used in an amount such that there is a substantially stoichiometric ratio of aluminum to hydroxyl groups.

The desired aluminum hydroxide agent of the present invention can also be formed from an acidic aluminum precursor material such as a water-soluble acidic aluminum salt as described hereinabove with a basic aluminate as described hereinabove by contacting the precursory materials in an aqueous system in suitable ratios to cause the resultant system to have a pH within the range described hereinbelow.

The aluminum hydroxide agents of the subject invention should be formed in an aqueous system which has an alkaline resultant pH and preferably a pH of at least about 8. The drilling fluids formed with such aqueous systems having a pH within the range of about 8 to about 10.3 and preferably between about 9 to 10 exhibit the desired properties of viscosity and non-Newtonian pseudoplasticity.

The aluminum hydroxide agents found useful in forming the desired drilling fluid composition of the present invention can be formed by various conventional processes including the formation of aluminum oxide monohydrate by the oxidation and subsequent hydrolysis of trialkyl aluminum compounds by known processes.

The subject aluminum hydroxide agent can be formed in an aqueous system. The acidic or basic precursor material can be present in concentrations of from about 5 to 50 percent by weight based on the water present. The concentration can vary outside of this range but should not be such as to inhibit the thorough mixing, preferably under high speed agitation, of the reactants during the formation of aluminum hydroxide viscosifying agent. Further, it has been found that the rheological properties of the resultant water-based fluid are further enhanced by initially subjecting the aqueous system containing the aluminum hydroxide agent to mixing at high shear rates of about 20,000 sec$^{-1}$ or greater for short periods of time as from 5 to 60 minutes such as by circulating the aqueous system through a small orifice I.D. tube at a high rate prior to utilization as a drilling fluid.

The aqueous system in which the subject aluminum hydroxide agent is formed can be directly used to form the water-based drilling fluids of the subject invention by diluting the aqueous system with a sufficient amount of water to form a system having an effective amount of the subject aluminum hydroxide agent therein to impart the desired rheological properties. Normally, concentrations of from 0.5 to 10 percent, and preferably from 2 to 6 percent, by weight based on the weight of the water have been found to impart the desired properties. The concentration most suitable can be readily determined in conventional manners by the mud engineer taking into consideration the concentration and nature of other materials which may also be contained in the drilling fluid. The pH of the water-based drilling fluid should be maintained within the ranges described above.

The above-described aluminum hydroxide agents are capable of causing a clay-free, (the term "clay-free" when used herein refers to the absence of drilling fluid viscosifying clays as an essential agent of the fluid and not to other materials entrained therein) water-based drilling fluid (the term "fluid" or "system" when used herein refers to water containing the aluminum hydroxide agent of the subject invention in solution, suspension or dispersion) to have suitable rheological properties of viscosity and non-Newtonian, pseudoplasticity, that is to say, that the viscosity of the resultant water-based drilling fluid varies inversely with respect to the shear rate exerted on the fluid. The relationship of the shear stress with respect to shear rate can be defined by the rheological power law model relationship of $$\tau = K(\dot{\gamma})^n$$

in which $\tau$ represents the shear stress exerted on the aqueous system of the drilling fluid in units such as pounds per 100·ft$^2$ or dynes/cm$^2$; $\dot{\gamma}$ is the shear rate in units of reciprocal time such as sec$^{-1}$; K is a constant having the value of the shear stress of the particular system at a shear rate of 1 sec$^{-1}$; and n is a numerical value of from 0 to 1. It has been unexpectedly found that water-based drilling fluids containing the presently described aluminum hydroxide viscosifying agent exhibit shear stress ($\tau$) properties at varying shear rates ($\dot{\gamma}$) in the range of from about 10 to 400 sec$^{-1}$, that is, in the range normally encountered in the annular region of the bore hole, such that n of the power law relationship has a value of less than about 0.4. Such systems, therefore, exhibit non-Newtonian, pseudoplastic properties to an exceptionally high and desirable degree.

FIG. 1 is a typical graphic presentation of the shear stress at varying shear rates which are obtained from aqueous solutions containing the presently disclosed product. When plotting log shear stress versus log shear rate, with log shear stress being plotted on the abscissa and log shear rate on ordinate of the graph, the desired properties are readily apparent. At low shear rates, such as from about 10 to about 400 sec$^{-1}$, as are encountered in the annular region of the bore hole, the shear stress should increase at a low rate with respect to the shear rate exerted on the material which is observed as a low slope (or n value according to the power law relationship) of the curve. The lower the slope or n value within this region the more desirable the fluid. In certain instances the slope may continuously or segmentally change but should retain an n value of about 0.4 or less. At high shear rates, such as above 20,000 sec$^{-1}$ as are found in the region of a drill bit in a drilling operation, the fluid should have a low viscosity, that is approach the viscosity of water since this permits high drilling rates. At such viscosities the fluid approaches a Newtonian liquid as can be seen by an increased slope of the curve (n having a value approaching or equal to unity). The value for K in the power law relationship is the shear stress value determined or extrapolated for a shear rate of 1 sec$^{-1}$ and is directly proportional to the viscosity of the aqueous system.

In addition to presently finding that the subject aluminum hydroxide agent imparts desired viscosity and pseudoplasticity to water-based drilling fluids, it has been further unexpectedly found that the subject agents have excellent stability to temperature, calcium and sodium salts and various other conditions desired of a fluid used in rotary drilling of bore holes and the like. The drilling fluids containing the subject aluminum hydroxide agents have unexpectedly been found to have high degrees of stability with respect to their rheological properties under various adverse conditions. Such fluids have been found to be stable after subjection to elevated temperatures for sustained periods of time, to high shear rates such as are encountered at the site of the drill bit, as well as being stable in the presence of various corrosive elements such as calcium chloride, and sodium chloride which may be entrained in such fluids.

The high degree and breadth of stability of the presently achieved drilling fluid, when combined with its ability to exhibit non-Newtonian, pseudoplastic properties under varying low shear rates of from about 10 to 400 sec$^{-1}$ and greater, such as are encountered in the annular region between the drill stem and the casing of the bore hole, aids in increasing the drilling efficiency, that is, the rate of drilling the bore hole. Drilling fluids having concentrations of from about 0.5 to about 10 percent, and preferably 2 to 6 percent, active solids (as aluminum hydroxide) yield fluid systems which unexpectedly have the desired properties.

The drilling fluid composition of the subject invention can contain other conventional drilling fluid additives such as water loss inhibitors as, for example, polyanionic cellulose and the like, and weighing agents as, for example, crushed oyster shells, barite, and the like.

The term "water-based" which is used herein in describing the present invention, generally includes drilling fluids which have a liquid base comprising substantially fresh water or salt water. However, it is to be realized that at times certain small amounts of other liquids may be emulsified or admixed with the water-based fluid. For example, drilling fluids may at times contain small amounts of oil, emulsified or admixed with the drilling fluid, the oil coming either from an oil formation drilled into or, under certain conditions, can be purposely added.

The presently described drilling fluids have several distinct advantages over fluids using conventional viscosifying agents, such as clays, Xanthan gums or synthetic organic polymers. The presently described drilling fluids have been found to be stable to various salts commonly found in drilling fluid compositions, while the commonly used clays, such as bentonite or attapulgite, are normally sensitive to the presence of such salts and lose their ability to impart viscosity to the fluids. Such clays should, therefore, not be used as a viscosifier component of the subject drilling fluids. Xanthan gums are also used as the viscosifying agents in drilling fluids but have the disadvantage of being expensive and unstable to temperature conditions normally found in the majority of drilling operations. The presently described drilling fluids need not contain such heat sensitive viscosifier materials as Xanthan gums and, therefore, can maintain their viscosity and pseudoplasticity after subjection to elevated temperatures as is normally encountered in bore holes. Synthetic organic polymers which are used as viscosifiers in drilling fluids are expensive and are only used under special application.

The present water-based, clay-free drilling fluids, having as their viscosifying agent the aluminum hydroxide agent described above and having a pH within the range of from at least about 8 to 10.3, have been found to be stable to temperature, the presence of calcium and sodium salts and to the presence of conventional drilling fluid additives. Further, the present drilling fluids are substantially non-corrosive and non-destructive to metal equipment commonly used in drilling operations.

This material can be used with conventional bore hole drilling equipment in manners known to those skilled in the art to efficiently and effectively drill bore holes into subterranean formations. The pseudoplastic properties of the present drilling fluids permits effective removal of the cuttings from the area at and around the drill bit to permit more efficient drilling of the formation.

The following examples are given for illustrative purposes only, and are not meant to be a limitation on the subject invention except as indicated by the appended claims. All parts and percentages are by weight unless otherwise indicated. The units of K of the power law model are lb-sec/100 ft$^2$.

EXAMPLE 1

To 227.6 parts of a 19.1 percent aqueous solution of a commercially obtained alkali metal aluminate ($Na_2O \cdot Al_2O_3 \cdot 3 H_2O$) was added 426 parts of 1 N HCl under high speed agitation. The pH of the solution was then adjusted to 9.1 with 50 percent aqueous solution of NaOH. A sample of the aqueous system was taken, dried and the resultant material was found to be amorphous when x-ray analyzed using a copper K-$\alpha$ source. The resultant aqueous system was circulated through a capillary tube (0.032 in I.D.) for about 30 minutes and was diluted with water according to the ratio of 7 parts aqueous viscosifier system to 3 parts water to form a fluid (active solid content=3.5 percent) having suitable rheological properties for use as a drilling fluid. The rhelogical properties of the fluid were determined using standard procedures with a Haake Rotovisco RV-1 rotating viscometer at varying low shear rates of from 8 to 1300 sec$^{-1}$ and at 25° C. The values determined for n (with respect to the shear rate range of from about 8 to about 500–800 sec$^{-1}$) and K (lbs-sec/100 ft$^2$) in accordance with the power law model relationship was 0.25 and 3, respectively, show that the fluid has a desirable viscosity and pseudoplasticity for use in drilling fluid.

EXAMPLE 2

A drilling fluid having aluminum hydroxide as its viscosifying agent was formed in the same manner as described in Example 1 above except that 426 parts of 1 N $H_2SO_4$ was used instead of the HCl. A sample of the resultant aqueous system was taken, dried and the resultant material was found to be amorphous when x-ray analyzed using a copper K-$\alpha$ source. The rheological properties of the drilling fluid were determined as described in Example 1 above and the value of n and K of the power law model relationship were found to be 0.4 and 0.6 respectively. The fluid had satisfactory properties for use in a drilling fluid.

EXAMPLE 3

To 238 parts of a 34.7 percent aqueous solution of $Al_2(SO_4)_3 16 H_2O$ was added 102 parts of a 30.5 percent solution of sodium hydroxide under high speed mixing. The material was further diluted with 18.5 parts water, and the pH was determined to be 9.5. A sample of the aqueous system was taken dried and the resultant material was found to be amorphous when x-ray analyzed using a copper K-$\alpha$ source. The resultant aqueous system was diluted (1:1) with water, circulated through a capillary and finally had its rheological properties determined as described in Example 1 above. The value for n and K of the power law relationship was 0.4 and 0.6 respectively.

EXAMPLE 4

The fluids formed according to Examples 1, 2 and 3 above were each tested for thermal stability in the following manner. A sample of each of the fluids was placed in a vessel which was then sealed and pressurized with $N_2$ to 50 psig. Each of the samples was then subjected to 250° F. for 16 hours while under continuous agitation. The vessel was allowed to cool to ambient temperature. The sample was removed and tested for rheological properties according to the procedure of Example 1 above using the Haake Rotovisco viscometer. The results obtained are indicated below:

TABLE 1

| Sample of Example | n | K |
|---|---|---|
| 1 | 0.3 | 5.7 |
| 2 | 0.2 | 7.1 |
| 3 | 0.3 | 10.1 |

Samples of each of the above materials were dried and analyzed by x-ray diffraction spectroscopy using standard techniques with a copper K-$\alpha$ radiation source. Each sample exhibited a major characteristic peak between 6.55 and 6.32 Angstroms.

EXAMPLE 5

An aqueous system of aluminum hydroxide agent was formed in the same manner as described in Example 1 above except that the amount of HCl was varied. (NaOH was not added) while holding all other parameters constant. The resultant aqueous system therefore had varying pH values. These samples were tested for rheological properties at both ambient conditions (25° C.) and after subjection to 250° F. for 16 hours under constant agitation as described in Example 4 above. The n and K values determined by the power law model are given in Table 2.

TABLE 2

| pH of Sample | at 25° C. | | after 250° F. for 16 hrs. | |
|---|---|---|---|---|
| | n | K | n | K |
| 8.4 | 0.11 | 6.9 | 0.23 | 7.0 |
| 8.6 | 0.13 | 5.2 | 0.18 | 9.0 |
| 9.0 | 0.18 | 5.3 | 0.26 | 7.4 |
| 9.1 | 0.18 | 3.9 | 0.31 | 6.0 |
| 9.3 | 0.27 | 2.5 | 0.29 | 6.4 |
| 9.4 | 0.18 | 2.5 | 0.29 | 6.0 |
| 9.6 | 0.21 | 2.5 | 0.18 | 10.3 |
| 10.0 | 0.32 | 1.0 | 0.23 | 9.6 |
| 10.2 | 0.31 | 1.1 | 0.35 | 4.9 |
| 10.4 | 0.85 | <0.1 | 0.35 | 4.0 |
| 10.6 | 1.00 | <0.1 | 0.35 | 1.29 |

An analysis of the results indicates that the combined properties of viscosity and pseudoplasticity, when taken with the consideration of corrosion effects of the metal drilling equipment, are best achieved at a pH of at least about 8 to 10.3 and preferably 9 to 10.

EXAMPLE 6

An aqueous system of aluminum hydroxide agent was prepared in the manner described in Example 1 except that the pH was adjusted to the indicated value. The concentration of aluminum hydroxide in each of the formed fluids was 3.4 percent. To the formed aqueous fluids containing aluminum hydroxide agent were added sodium or calcium chloride alone or in combination with other materials normally encountered as components of drilling fluids. The samples were tested at 77° F. and were also subject to 250° F. for 16 hours in a rotating pressurized vessel as described in Example 4 above. The results given below indicate that the present aluminum hydroxide viscosifying agent is stable to the added materials and retains its pseudoplastic properties.

TABLE 3

| Sample | % NaCl | % CaCl$_2$ | % Other | Initial | | | After 250° F. for 16 hours | |
|---|---|---|---|---|---|---|---|---|
| | | | | pH | n | K | n | K |
| A | — | — | — | 9.4 | 0.17 | 7.6 | 0.18 | 3.4* |
| B | — | — | B58 | 9.5 | 0.31 | 1.8 | 0.34 | 14.7 |
| C | 10 | — | B58 | 9.4 | 0.39 | 2.0 | 0.30 | 20.0 |
| D | — | 5 | B58 | 9.4 | 0.32 | 3.8 | 0.30 | 8.6 |
| E | 10 | — | — | 9.3 | 0.16 | 4.5 | 0.15 | 3.3* |
| F | — | 5 | — | 9.6 | 0.11 | 5.2 | 0.13 | 5.7* |
| G | — | — | B31 | 9.3 | 0.18 | 6.4 | 0.21 | 3.1* |
| H | 10 | 5 | B31 | 9.5 | 0.12 | 10.0 | 0.18 | 6.0* |
| I | — | — | G15 | 9.5 | 0.33 | 1.2 | 0.22 | 2.2 |
| J | 10 | — | G15 | 9.6 | 0.25 | 1.75 | 0.16 | 5.2 |
| K | — | 5 | G15 | 9.4 | 0.28 | 2.75 | 0.17 | 21.0 |
| L | — | — | D5 | 9.3 | 0.30 | 0.88 | 0.40 | 6.4 |
| M | — | — | D15 | 9.3 | 0.40 | 0.54 | 0.23 | 7.0 |
| N | — | 5 | D5 | 9.2 | 0.35 | 1.2 | 0.31 | 15.9 |
| O | — | 5 | D15 | 9.4 | 0.20 | 1.8 | 0.19 | 25.0 |

*250° F. for 64 hours
B - Barite
G - Glen Rose Shale
D - Dolomite

While the invention has been described in connection with certain preferred embodiments, it is not intended to limit the invention to the particular forms set forth, but, on the contrary, it is intended to cover such alternatives, modifications and equivalents as defined by the appended claims.

What is claimed is:

1. In a water-based, clay-free drilling fluid suitable for circulating in a bore hole while drilling the bore hole into subterranean formations including water, a water-loss inhibitor, a weighting agent and a viscosifying agent, the improvement which comprises that said viscosifying agent is an aluminum hydroxide viscosifying agent formed in an aqueous medium by contacting and mixing under a high degree of agitation a water soluble alkali metal aluminate with a water soluble acidic compound selected from the group consisting of an inorganic acid or a salt of a strong acid and a weak base; said aluminate to acidic compound are in a ratio to cause the resultant aqueous medium to have a pH of at least about 8, said viscosifying agent is present in said fluid in from about 0.5 to 10 percent by weight based on the weight of the water present to impart pseudoplastic properties to said fluid and said fluid has a pH of from about 8 to about 10.3.

2. In a water-based, clay-free drilling fluid suitable for circulating in a bore hole while drilling the bore hole into subterranean formations including water, a water-loss inhibitor, a weighting agent and a viscosifying agent, the improvement which comprises that said viscosifying agent is an aluminum hydroxide viscosifying agent formed in an aqueous medium by contacting and mixing under a high degree of agitation a water soluble acidic aluminum compound selected from the group consisting of an aluminum halide, aluminum sulfate and aluminum nitrate with a water soluble base selected from the group consisting of an alkali metal hydroxide, ammonium hydroxide or an alkali metal aluminate; said aluminum compound to base are present in a ratio to cause the resultant aqueous medium to have a pH of at least about 8, said viscosifying agent is present in said fluid in from about 0.5 to 10 percent by weight based on the weight of the water present to impart pseudoplastic properties to said fluid and said fluid has a pH of from about 8 to about 10.3.

3. The water-based, clay-free drilling fluid of claim 1 or 2 wherein the aluminum hydroxide agent is characterized by x-ray diffraction spectra as being amorphous or as exhibiting a major diffraction peak between 6.1 and 6.5 Angstroms and wherein the pseudoplastic property of said aqueous system is defined by the formula:

$$\tau = K(\dot{\gamma})^n$$

in which $\tau$ represents the shear stress of the aqueous phase; $\dot{\gamma}$ represents the shear rate within the range of from about 10 to 400 sec$^{-1}$; K is a constant having the value of shear stress at the shear rate of 1 sec$^{-1}$; and n has a value of up to about 0.4.

4. The water-based, clay-free drilling fluid of claim 3 wherein the drilling fluid has a pH of from 9 to 10.

5. The water-based, clay-free drilling fluid of claim 3 wherein the resultant aqueous media containing the aluminum hydroxide agent is subjected to mixing at high shear ratios of at least about 20,000 sec$^{-1}$ for short periods of time.

6. The water-based, clay-free drilling fluid of claim 3 wherein the aluminum hydroxide agent is present in from about 2 to 6 percent by weight based on the weight of the water present.

7. In the process of drilling a bore hole into a subterranean formation using conventional bore hole drilling equipment, the improvement comprising circulating in the bore hole while drilling the drilling fluid defined by claim 1 or 2.

8. In the process of drilling a bore hole into a subterranean formation using conventional bore hole drilling equipment, the improvement comprising circulating in the bore hole while drilling the drilling fluid defined by claim 3.

9. In the process of drilling a bore hole into a subterranean formation using conventional bore hole drilling equipment, the improvement comprising circulating in the bore hole while drilling the drilling fluid defined by claim 4.

10. In the process of drilling a bore hole into a subterranean formation using conventional bore hole drilling equipment, the improvement comprising circulating in the bore hole while drilling the drilling fluid defined by claim 5.

11. In the process of drilling a bore hole into a subterranean formation using conventional bore hole drilling equipment, the improvement comprising circulating in the bore hole while drilling the drilling fluid defined by claim 6.

* * * * *